US005755185A

United States Patent [19]

Gallagher

[11] Patent Number: 5,755,185

[45] Date of Patent: May 26, 1998

[54] TRAINING HARNESS

[76] Inventor: Vernon Ray Gallagher, 962 Little River 19, Foreman, Ark. 71836

[21] Appl. No.: 785,359

[22] Filed: Jan. 17, 1997

[51] Int. Cl.$^{6}$ .............................. B68B 1/00; A01K 27/00

[52] U.S. Cl. .............................. 119/792; 54/34; 54/71

[58] Field of Search .............................. 54/24, 34, 71; 119/792, 816, 818

[56] References Cited

U.S. PATENT DOCUMENTS

| | | | |
|---|---|---|---|
| 348,991 | 9/1886 | Paine | 54/34 |
| 444,387 | 1/1891 | Harris | 54/71 |
| 815,164 | 3/1906 | Hayner | 54/24 |
| 1,743,889 | 1/1930 | Hannam | 54/24 |
| 2,814,923 | 12/1957 | Knauss | 54/71 |
| 5,305,710 | 4/1994 | Ward, Jr. | 119/792 X |

FOREIGN PATENT DOCUMENTS

| | | | |
|---|---|---|---|
| 2449646 | 10/1980 | France | 54/71 |

*Primary Examiner*—Robert P. Swiatek
*Attorney, Agent, or Firm*—Sidley & Austin

[57] ABSTRACT

A training harness and harness assembly for training livestock. The assembly includes a halter with a guiding ring attached, a neck strap, a belly strap, a back strap, a buck strap and a harness lead.

9 Claims, 4 Drawing Sheets

TRAINING HARNESS

TECHNICAL FIELD OF THE INVENTION

This invention relates to training harnesses for livestock and in particular for training equine.

BACKGROUND OF THE INVENTION

Handling of untrained livestock can be very difficult. Particular problems of interest are being able to load untrained livestock in trailers and to tie up untrained livestock in a manner which is likely not to cause injury to the animal. In training many types of livestock it is desired that the animals be trained to follow a lead rope without resistance. Such training is especially important for horses, mules, donkeys, oxen, and other draft animals and saddle animals. Training an animal to lead is also important for a wide variety of livestock such as cattle, sheep, goats, etc. for show purposes and entertainment purposes. The most important animal to be trained to lead is a horse, because these are the animals most widely used for draft and saddle purposes. Prior methods for training animals to follow a lead rope have the disadvantage that they could cause damage to the nerves and muscles in the neck of the animal. Such damages make the animal less responsive to further training sessions and use where command signals are given by touching the neck and where the neck nerves and muscles are important for the animal to perform such as are needed for cutting horses. If the damage to the nerves in the animal's neck were sufficient it could ruin the animal for further training, resulting in the waste of much time, money and effort invested into the preliminary training.

The present invention has the advantage of substantially eliminating the risk of damaging the nerves and neck muscles of the animal in the preliminary phases of the training. Further, the present invention has the advantage that it provides the trainer with sufficient leverage to control an untrained animal. By proper use of this additional leverage the trainer can teach the animal that resistance is futile, thereby eliminating resistance and speeding the training process. The invention also has the advantage that it can be made adjustable, if desired, such that the same equipment can be used on different sized animals. The invention has the advantage of providing the trainer with a harness which will greatly ease the ability to load untrained animals into trailers and to tie up such animals in a manner so as to minimize potential injuries to the animal when it attempts to break free.

SUMMARY OF THE INVENTION

The invention is a training harness and a training assembly. The training assembly includes a halter around the animal's head to which the training harness is connected. The training harness is used in conjunction with the halter. The training harness includes: a buck strap which encircles the animal around its rear hips, along its sides and towards its head, a back strap placed over the rear of the animal to support the buck strap in the desired location on the rear of the animal, a belly strap encircling the animal near its front legs for supporting the mid portion of the buck strap in slidable engagement, a guide member for attachment to the halter and through which the ends of the buck strap pass in slidable engagement, a neck strap which encircles the animal's neck and is connected to one end of a harness lead which also passes through the guide member in a slidable fashion, the ends of the buck strap are secured to the harness lead. Preferrably the back strap which goes across the rear of the animal's back in the area of the rear hip has support receptacles for receiving the buck strap. The support receptacles receive the buck strap which encircles the animal's rear and extends along the sides of its body. The belly strap positioned around the midsection of the animal preferrably has a set of guiding receptacles through which the buck straps pass in a slidable engagement. The buck strap is supported in such a fashion by the back strap and belly strap such that the buck strap is moveable in relation to the belly strap. In the preferred embodiment, the belly straps also include a leg ring. The harness lead which is attached to the neck strap at one end preferrably has a ring connected to it at a predetermined distance from the end attached to the neck strap. This ring can be used for the connection of the ends of the buck strap to the harness lead. When assembled the harness lead and the ends of the buck strap can slide through the guide member attached to the halter.

In the preferred embodiment, the buck strap is adjustable in length. The back strap is preferably constructed such that the support receptacles for the buck strap allow variations in the height of the buck strap. The belly strap is also preferably constructed such that its guiding receptacles are along the forward portion of the animal's body at a predetermined height adjustable to permit the positioning of the buck strap.

In a preferred embodiment the harness lead has a connector for the buck strap ends which is larger than the guide member attached to the halter so that the connector can not pass through the guide member. Thus, when the harness assembly is properly installed and fitted on the animal, the front portion of the buck strap will be held up so as to minimize the possibility of entangling the front legs of the animal when no pressure is applied on the harness lead by the trainer.

In another aspect, the present invention relates to the combination of the halter and the neck strap with a lead rope extending from the neck strap through the guide member of the halter. This embodiment is useful in the transition from the use of the full training harness to just a halter alone, by providing a degree of control intermediate of the control provided by a halter alone and the full training assembly of the invention.

BRIEF DESCRIPTION OF THE DRAWINGS

The present invention will be better understood with reference to the detailed description and the drawings.

DETAILED DESCRIPTION

Figure 1:
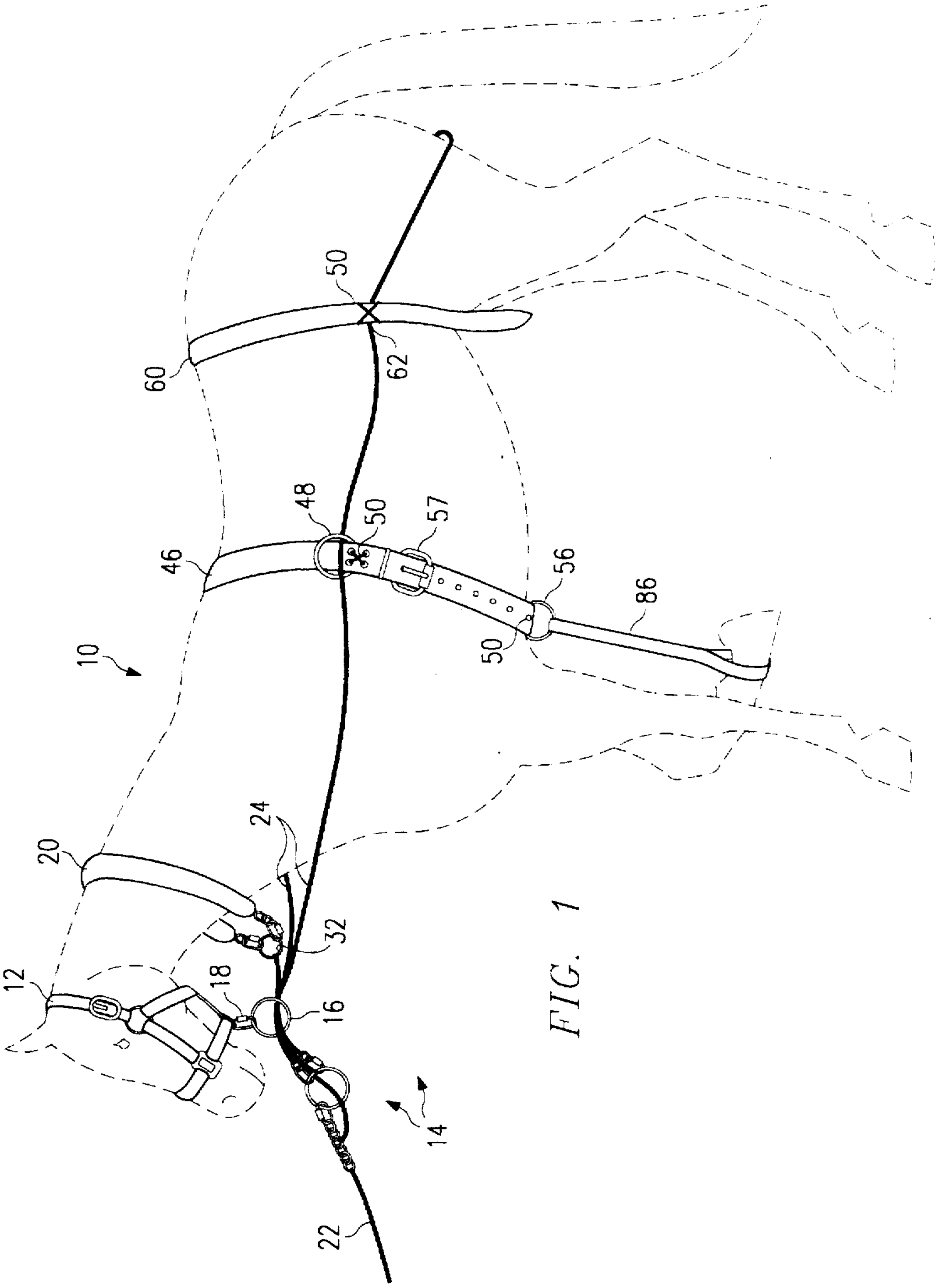
FIG. 1 is a side view of the invention shown with a horse in phantom.

The invention will be described in relation to use with a horse; however, it is understood that the invention is applicable to most types of livestock. In the figures, like numbers refer to like items. FIGS. 2–8 show individual components and alternative components of the training harness assembly. FIG. 1 shows the components of the training harness in an assembled fashion.

Referring to FIG. 1, the invention is a training assembly 10 having a halter 12 and a training harness, generally indicated as 14. Halter 12 may be of any standard design and construction of halters known for use with livestock. The halter 12 is connected to a guiding member 16. This guiding member 16 is preferably a ring which can be connected to the halter 12 by guide connector 18 which can be a quick link, snap fastener or any other suitable mechanism which allows connection of the ring to the halter. A quick link is preferred for strength. The guide connector allows a standard halter 12 (shown in FIG. 6) to be used in the assembly. The guide member 16 is attached to halter 12 such that the ring will hang below the jaw of the animal.

The training harness 14 includes a neck strap 20, a harness lead 22, a back strap 60, a buck strap 24, and a belly strap 46. The buck strap 24 encircles the animal, passes through the guide member 16 and is connected to the harness lead 22.

The guide member 16 should have a sufficient internal diameter to permit free passage of the harness lead 22 and the ends of the buck strap 24 through the guide member 16 such that the lead and buck strap can move through the guide member without binding. Guide member 16 can be of any suitable configuration which allows sliding movement of the harness components through it. It has been found that a metal ring with an inside diameter of about 2 inches is suitable. The ring should be of sufficient strength to resist bending or breaking and other anticipated stresses. The guide member can be made of any other construction which allows the lead ropes to slide freely through the guide member, for example a ring made from a stiff rope, a loop of nylon material, etc. "Guide member" and "ring" as used in this application are used to mean an enclosed member or a member which can be opened and closed to allow the member to be closed around an item.

Figure 2:
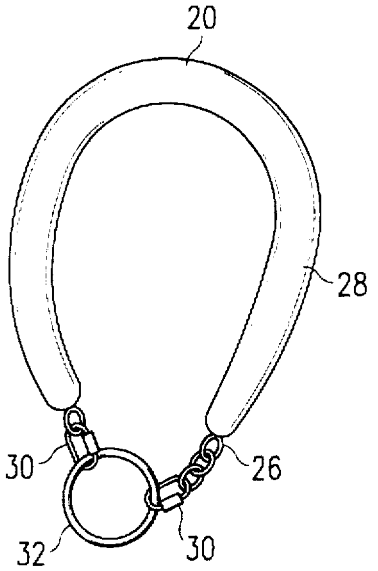
FIG. 2 is a view of the neck strap of the training harness.

FIG. 2 shows the neck strap 20. Neck strap 20 is dimensioned such that it will fit snugly around the horse's neck near the horse's head. Preferably, neck strap 20 is made such that its length is adjustable to allow fitting to different sized horses. In a preferred embodiment, neck strap 20 is constructed of a length of chain 26 which is covered with a cushioning pad 28 of any suitable material such as rubber, foamed polymers, cloth padding and the like, in the form of a tube of a sufficient thickness to protect the horses neck. Further, pad 28 covers a sufficient portion of the chain 26 such that most of the horse's neck will be protected from direct contact with the chain. Adjustments to the size of the strap can be made by use of neck connectors 30 which preferably are quick-links. A quick-link is a piece of metal shaped like a chain link but has a threaded sleeve which allows the link to be opened and closed to permit connection to links in a chain to other similar links. In lace of the quick-link, one could use a snap-ring, a piece of rope, a celvis and pin, or any other suitable item to connect the parts. A neck ring 32 is connected to the neck strap 20. Alternatively, the neck strap can be constructed of a piece of strap material such as leather or nylon, rather than a chain. For example, the neck strap can be made from a wide leather strap with a buckle and hole closure mechanism.

The neck strap 20 is placed on the horse at the throat latch of the horse. In the illustration of FIG. 1 the neck strap is shown in a lower position than desired in use for purposes of allowing better illustration of the components of the invention. Placement at the latch of the throat will allow the neck strap 20 to be adjusted so that it is small enough that the horse can not pull it over his head. Placement lower on the neck will work but is not preferred.

Figure 3:
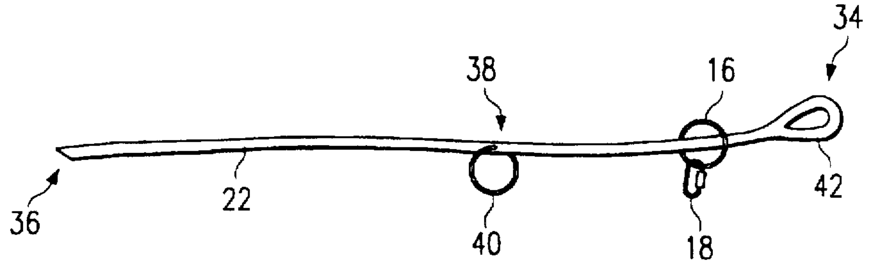
FIG. 3 is a view of the harness lead of the training harness.
Figure 5:
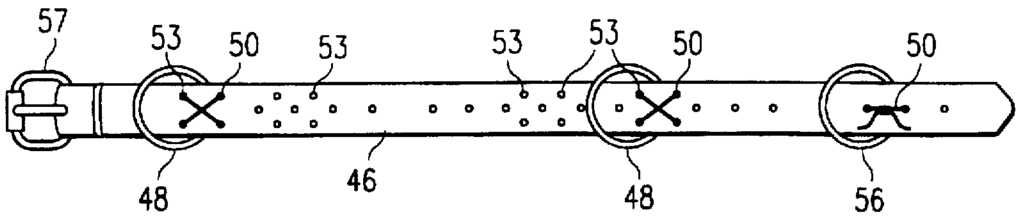
FIG. 5 is a view of the belly strap of the training harness.
Figure 6:
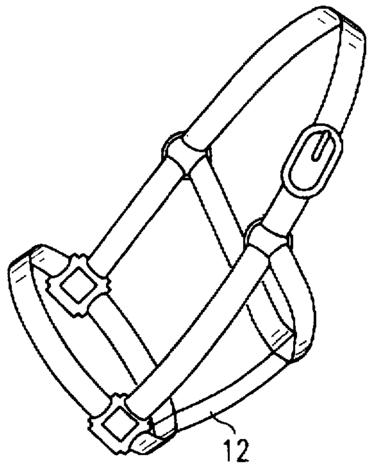
FIG. 6 is a view of a halter used in the harness assembly.

Attached to the neck strap 20 is harness lead 22 shown in FIG. 3. In the preferred embodiment, harness lead 22 has a first end 34 and a second end 36. At a predetermined distance 38 from the first end 34 is the location for attachment of the ends of the buck strap to the harness lead. In the preferred embodiment a connection ring 40 is provided for making the connection of the ends of the buck strap to the harness lead more convenient. In the preferred embodiment of the invention the harness lead 22 has an eye 42 at the first end 34 of the harness lead 22 of sufficient size that the second end 36 and the ring 40 can pass. The eye is also of sufficient size to permit guide member 16 to pass through it. Thus, the harness lead 22 can be attached to neck ring 32 by passing the second end 36 of the lead 22 through the ring 32, and through the eye 42 until the lead tightly surrounds the ring 32. Alternatively the eye can be connected to the neck strap by putting a quick link through the eye. The result will be that the first end 34 of the lead 22 is connected to the neck strap and guide member 16 is slidable disposed about the harness lead 22 between the neck strap and the connection ring 40.

Figure 4A:
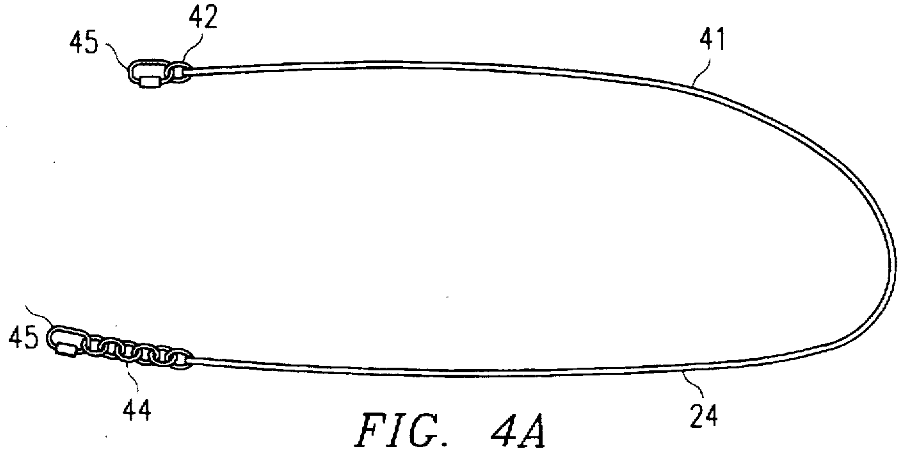
FIG. 4A is a view of one embodiment of the buck strap of the training harness.

The training harness includes a buck strap 24 which encircles the animal's rear and extends along the sides of its body and extends towards the animal's head as shown in FIG. 1. In FIG. 4A, the buck strap 24 is a length of rope 41 with short lengths of chain 42 and 44 at the first end and the second end of the buck strap 22. The chain ends 42,44 of the buck strap 24 pass through guide member 16 and are attached to the harness lead 22 at a determined point 38 intermediate of the ends of the harness lead 22. In the preferred embodiment the ends of the buck strap 24 are connected by quick links 45 to the buck strap connector or ring 40 attached to the harness lead 22 to make the attachment convenient.

The ends of the buck strap can be connected to the harness lead in any suitable manner. In this description of the preferred embodiment the connections described include more pieces and items than are necessary for most of the connections. Those skilled in the art will understand that this is for purposes of convenience to the user. What is important in the invention is the various connections between the parts and how the major parts of the invention interact. The connections can be made in numerous manners.

Ring 40 is preferably of sufficient size that it will not pass through guide member 16, so that the front portion of the buck strap 24 will be held up even if the trainer is not holding the harness lead 22.

The training harness 14 includes a belly strap 46 (shown in FIG. 5) positioned around the midsection of the horse and having two or more guide members 48 positioned thereon with at least one guide member on each side of the animal. Buck strap 24 passes through these guide members 48 as shown in FIG. 1 such that the buck strap can slide easily in the guide members 48. In the preferred embodiment, shown in FIG. 5, two guide members 48 are used which are detachable from the belly strap. In the embodiment illustrated, the guide members 48 are tied on by ropes 50 passing through holes 53 in the belly strap 46. A series of holes 53 is provided such that the position of the guide members 48 on the belly strap 46 can be varied to accommodate different sizes of animals. The guide members 48 of the belly strap 46 are preferably positioned such that the buck strap is held just above the chest of the horse close to the top of the hip as shown in FIG. 1. The belly strap has a closure mechanism such as buckle 57 to tighten the strap on the animal. Two or more guide members 48 can be attached to the belly strap to provide several possible locations for positioning the buck strap; however, using a single member whose position can be moved as illustrated is very satisfactory. A leg ring 56 can also be attached to belly strap 46 by a piece of rope 50.

The buck strap 24 is slidably disposed in the guide members 48 of the belly strap 46. The buck strap 24 should be easily movable in relation to the belly strap 46. It has been found that the guide members 48 of the belly strap 46 should preferably be metal rings when the buck strap 24 is made of rope. To minimize binding, the rings 48 should be of a diameter substantially larger (more than about 25%) than that of the rope.

In the preferred embodiment, the belly strap 46 also has attached to it a leg ring 56 for tying up a front leg of the horse as shown in FIG. 1. Leg ring 56 on the belly strap 46 can be useful to control the horse when putting the training harness on him. One can first put the belly strap on the horse. Then, by lifting one of the horse's front legs and tying a rope, such as lead 86, around its foot and passing the rope through ring 56, the trainer can keep the horse on three legs which will restrict the horse's movement. This then allows the trainer to put on the remaining parts of the harness with less trouble.

Figure 7:
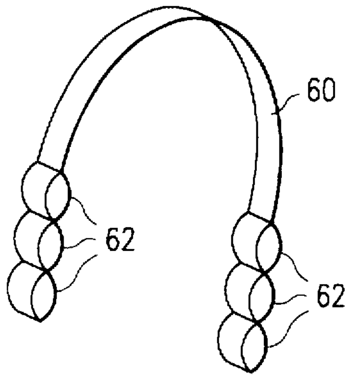
FIG. 7 is a view of a back strap used in the training harness.

The training harness 14 includes a back strap 60 which goes across the rear of the animals back in the area of the rear hips and which is connected to the buck strap 24 as shown in FIG. 1. Preferably the back strap 60 is constructed with two or more support receptacles 62 as shown in FIG. 7. The receptacles 62 are advantageous because they allow the buck strap 24 to be supported while the fit of the buck strap 24 and back strap 60 to the animal is being adjusted. When properly fitted, the buck strap 24 can be secured to the back strap 60 by tying the buck strap 24 and back strap 60 together with a section of rope 50 such that they do not move with relation to each other. As illustrated, a plurality of receptacles 62 in the form of loops can be provided at each end of back strap 60. These loops can be sewn in a piece of nylon ebbing. The purpose of these loops is to permit proper placement of the buck strap on the animal and to allow use with animals of varying size.

In a preferred embodiment, the harness lead 22 is used which connects to the ring 32 attached to the neck strap 20 by looping one end of it through the ring 32 and then through the other end of the harness lead which is equipped with an eye. Attached to the harness lead at a predetermined distance from the end of the lead attached to the neck strap is a buck strap connecting ring 40. The harness lead is used to make the training harness assembly where a halter, belly strap, back strap, neck strap, and buck strap are supported on the animal by the belly strap, the back strap and the guide member on the halter. The neck strap in a properly adjusted harness does little supporting of the buck strap. The buck strap should be adjusted such that as the trainer pulls on the first end of the harness lead 22 so that the lead 22 up to the buck strap connection 40 will become taut, then the buck strap 24 will become taut and pressure will be applied to the hips of the animal encouraging him to move forward. At this point the portion of the harness lead 22 between the place of buck connection 40 and the neck strap connection 32 should be slack such that no significant pressure is placed on the neck. Only if the buck strap breaks will the slack be fully taken out of all of the harness lead. In such a circumstance the trainer still retains a good control of the animal because the neck strap in combination with the halter provides a more secure grip on the animal than a halter alone would do. Also, the likelihood of injury to the horse is reduced by the configuration of the invention.

Figure 4B:
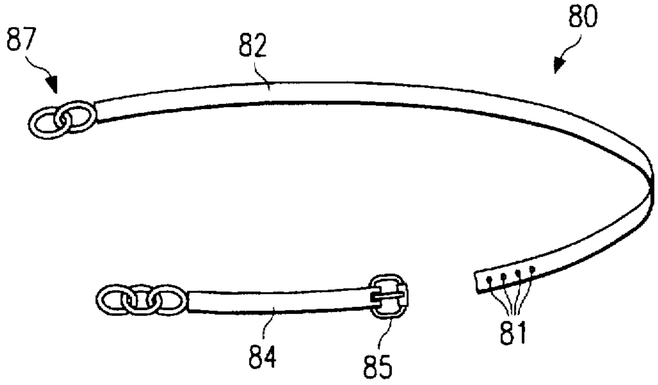
FIG. 4B is a view of an alternate embodiment of the buck strap of the training harness.

FIG. 4B shows an alternate embodiment of a buck strap. Buck strap 80 as illustrated has two sections, a first section 82 and a second section 84. In the embodiment shown, the strap 82 is provided with holes 81 at its first end for cooperation with buckle 88 on the first end of strap section 84. This provides another location where the length of the buck strap 80 can be adjusted. The two-piece construction is desirable in order to allow adjustment of the buck strap to fit a greater range of different sizes of horses than would be possible without such a second adjustment. Chain links 87 provided at one end of strap 82 provide another place where the length may be adjusted to fit the horse. Although buckle 85 and holes 81 are illustrated as the method for connecting the two, any suitable arrangement can be used such as the use of two "D" rings placed together on the end of strap 84, such that the end of the other section 82 can be passed through both "D" rings and then brought back in between the rings to form a connection as is well known in the art. At each end of buck strap 80 are preferably adjustment links 87. Adjustment links 87 can be of chain, looped nylon straps and other constructions that provide openings such that the length of the strap may also be adjusted and so that the strap may be closed in front of the animal. In the preferred embodiment, buck strap 80 is of a light weight strong material such as a leather strap, nylon strap, or rope.

Unbroken horses will generally resist being lead. If only a halter is used with a lead rope the trainer has little leverage against the horse's strong neck muscles and against the horse backing away or rearing up from the trainer. As the trainer tries to overcome the horse's resistance the halter bites into the horse's neck and head and possibly can cause damage to the muscles and/or nerves. Also, the halter can break and the horse escape. In training, if the horse escapes it will reinforce his desire to resist and to escape again. Thus, one benefit of the invention is that its construction makes it difficult for the horse to escape from the trainer. The invention overcomes much of the difficulties of trying to train a horse to lead or to be loaded in a trailer by using a halter alone. When the invention is placed on the horse, if the horse resists, the forces applied by the trainer pulls the buck strap into the hips of the horses rear legs, the rope passing through the ring on the neck strap helps hold the horse's head down to prevent him from obtaining leverage. Thus, when the horse resists being lead, pulling on the lead rope will cause the buck strap to gather under the horse's hip preventing him from rearing back and obtaining leverage by which the trainer can prevent the horse from rearing up and/or restrict movement of the horse's hind legs such that it is difficult for the horse to back up. The neck strap keeps the front portion of the horse's body low again, preventing him from rearing. The lead is passed through the guiding ring 16 on halter 12. This is important to keep the horse's head in proper position and to teach the horse to follow the lead rope. Thus, when the training harness is no longer needed, the horse will follow a lead attached to a halter without resistance.

Figure 9A:
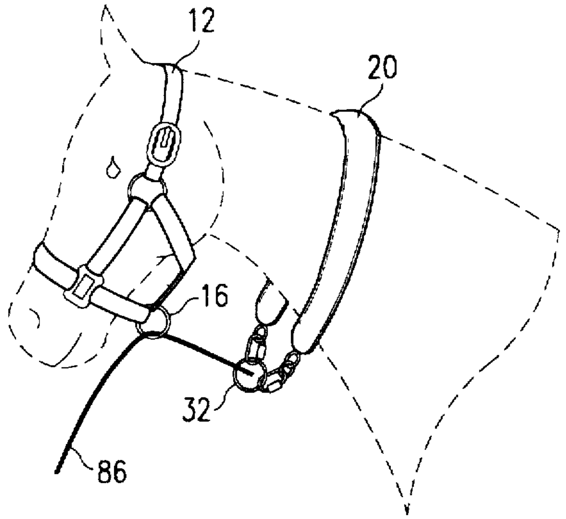
FIG. 9A is a view of a neck strap, lead and halter combination for training.
Figure 9B:
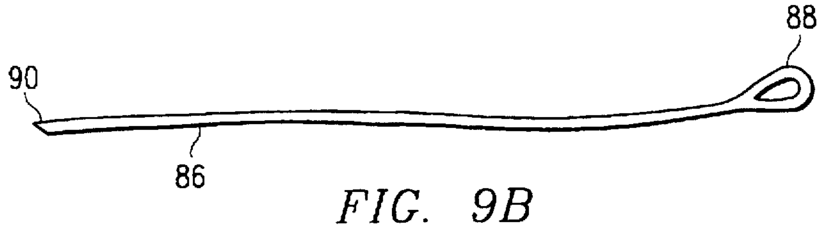
FIG. 9B is a view of the lead used in FIG. 9A.

FIG. 9A is a side view of another aspect of the present invention which is a combination of the neck strap 20, halter 12 and a lead rope 86. Lead rope 86 has a first end 90 and a second end with eye 88. In this embodiment, lead rope 86 is attached to the neck strap 20 by passing the first end 90 through the ring 32 on the neck strap 20 and through the eye 88 and tightened lead 86 on the ring 32. The first end 90 is then passed through the guide member 16 which is attached to the halter 12. This combination can be used for transition training from the full training assembly to just a halter alone, by providing a degree of control intermediate of the control provided by the invention and by a halter alone. When the training harness is removed, some animals may resist being lead because the signal or cue of the pressure from the buck strap is missing. It has been found that the combination shown in FIG. 9A can be useful in the transition from the training harness assembly to the use of a halter alone.

Figure 8:
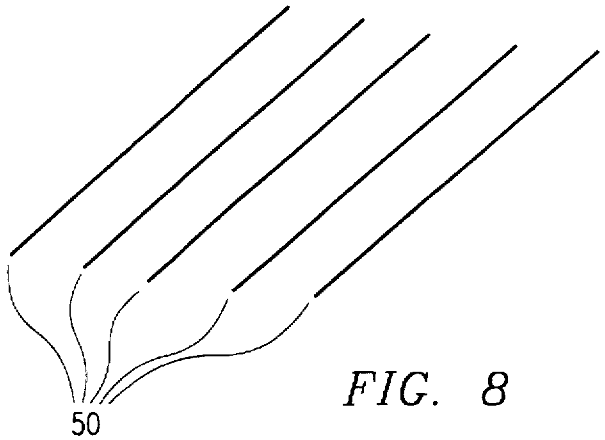
FIG. 8 is a view of the rope sections used in assembly of the harness.

The training harness assembly can be made of a wide variety of materials and any material known useful for harness and tack can be used. The halter can be made of leather or nylon with metal connections for the various pieces. The buck strap is preferably a rope with chain lengths attached to the end to facilitate easy connection and removal of the buck strap. Rope is well suited for the buck strap because it will slide easily without binding. Leather, chain or cable could be used also. The back strap and belly strap can be of leather, nylon or other heavy fabric. The rings are usually made of metal such as steel or brass. The embodiment illustrated is a very flexible design with a minimum of components. As shown in FIG. 8, five short lengths of rope 50 are all that is needed to tie the buck strap to the back strap and to tie the guide members and leg ring to the belly strap. While other means could be used, rope is a cheap, flexible and reliable means.

I claim:

1. A training harness comprising:

(a) a neck strap having first and second ends;

(b) a harness lead having a first end and second end, said first end attached to said neck strap;

(c) a belly strap having first and second ends, and having guide members attached thereto;

(d) a back strap having first and second ends; and (e) a buck strap having a first and a second end, the buck strap being connected to said back strap and slidably engaging said guide members of said belly strap, said ends of the buck strap being connected to said harness lead at a predetermined point intermediate the ends of said harness lead.

2. The harness of claim 1 wherein said neck strap comprising a chain with a cushion pad attached thereto intermediate of said first and second ends.

3. The harness of claim 1 wherein said belly strap has a leg ring connected thereto.

4. The harness of claim 1 wherein said buck strap is of two piece construction having a connection intermediate of said first and second end permitting adjustments to length of said strap.

5. The harness of claim 1 further comprising a halter with a guiding member attached thereto.

6. The harness of claim 5 wherein said harness lead has a buck strap connection ring spaced a predetermined distance from said first end of said lead and dimensioned such that it can not pass through said guiding member attached to said halter.

7. A training harness assembly comprising:

(a) a halter with a guiding member attached thereto;

(b) a neck strap having a first and a second end;

(c) a harness lead having a first and a second end, said first end being attached to said neck strap and the lead passing through the guiding member attached to said halter;

(d) a belly strap having a first and second end, with a coupling mechanism to connect the two ends, and guiding members located between the first and second ends for slidably receiving a buck strap;

(e) a back strap having a first and second end; and (f) a buck strap having a first and a second end, connected to said back strap, slidably engaging said guiding members of said belly strap and slidably engaging said guiding member attached to said halter and said ends of said buck strap being connected to said harness lead at a predetermined point intermediate of said ends of said harness lead.

8. The training assembly of claim 7 wherein said back strap has two or more receptacles adjacent each end for engaging said buck strap.

9. The training assembly of claim 7 further comprising a leg ring connected to said belly strap.

* * * * *